(12) United States Patent
Sun et al.

(10) Patent No.: US 12,234,721 B2
(45) Date of Patent: Feb. 25, 2025

(54) AUTOMATED CONFIGURATION OF TELEMETRY TRANSMISSION

(71) Applicant: Schlumberger Technology Corporation, Sugar Land, TX (US)

(72) Inventors: Liang Sun, Katy, TX (US); Pavel Annenkov, Houston, TX (US); Robert Tennent, Cambridge, MA (US); Andriy Gelman, Somerville, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/660,637

(22) Filed: Apr. 26, 2022

(65) Prior Publication Data

US 2022/0341316 A1 Oct. 27, 2022

Related U.S. Application Data

(60) Provisional application No. 63/179,610, filed on Apr. 26, 2021.

(51) Int. Cl.
*E21B 47/13* (2012.01)
*H04B 17/10* (2015.01)
*H04B 17/318* (2015.01)
*H04B 17/382* (2015.01)

(52) U.S. Cl.
CPC .......... *E21B 47/13* (2020.05); *H04B 17/102* (2015.01); *H04B 17/318* (2015.01); *H04B 17/382* (2015.01)

(58) Field of Classification Search
CPC ........ E21B 47/13; E21B 47/125; E21B 47/18; E21B 47/12; H04B 17/102; H04B 17/318; H04B 17/382; H04B 17/309
See application file for complete search history.

(56) References Cited

U.S. PATENT DOCUMENTS

| | | | |
|---|---|---|---|
| 4,060,716 A * | 11/1977 | Pekrul | G05B 23/0283 376/217 |
| 9,771,792 B2 | 9/2017 | Xu et al. | |
| 11,536,132 B2 * | 12/2022 | Xia | E21B 47/06 |
| 2008/0123725 A1 * | 5/2008 | J | H04B 17/327 375/224 |
| 2012/0130643 A1 * | 5/2012 | Ozdemir | G01V 1/36 702/14 |
| 2015/0043925 A1 * | 2/2015 | Fujisawa | H04B 10/60 398/208 |
| 2020/0110185 A1 * | 4/2020 | Xu | G01V 1/181 |
| 2020/0200939 A1 | 6/2020 | Chung et al. | |
| 2020/0252881 A1 * | 8/2020 | Noel | H04B 7/18517 |
| 2020/0355838 A1 * | 11/2020 | Venna | G01V 1/306 |

* cited by examiner

*Primary Examiner* — Amine Benlagsir
(74) *Attorney, Agent, or Firm* — Bryan K. Adams

(57) ABSTRACT

A method for configuring telemetry transmission includes receiving a transmitted telemetry signal at the earth's surface. The received signal is selected and processed to compute a measured power spectral density (PSD). A theoretical PSD is computed of the transmitted signal at the known carrier frequency and processed in combination with the measured PSD to compute an attenuation factor of the transmitted signal at a plurality of frequencies.

19 Claims, 8 Drawing Sheets

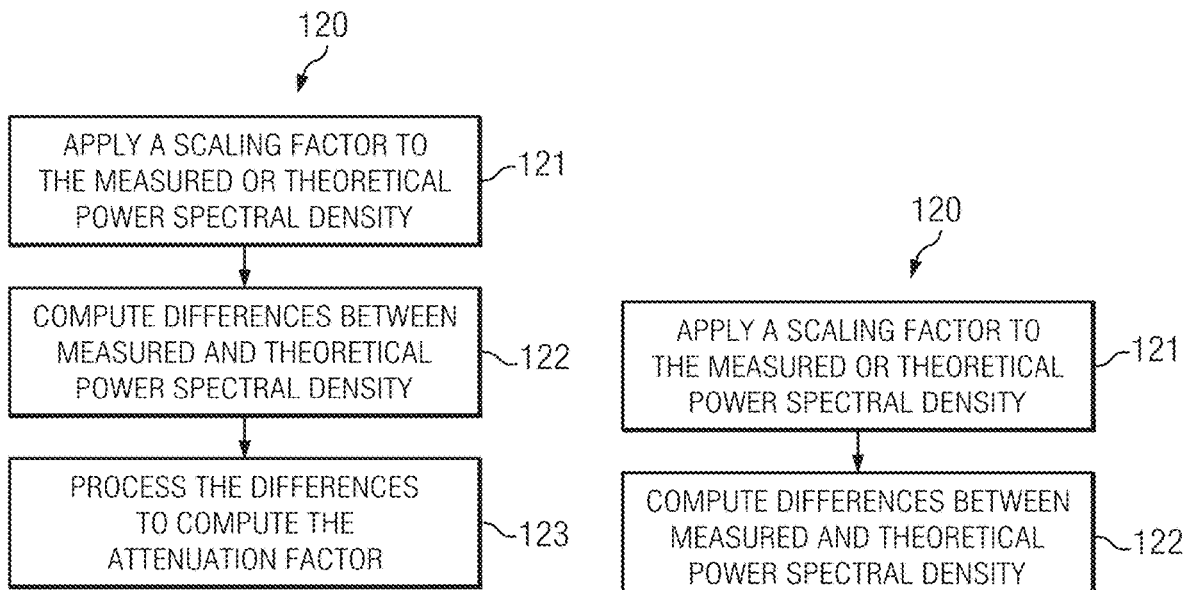
FIG. 3A
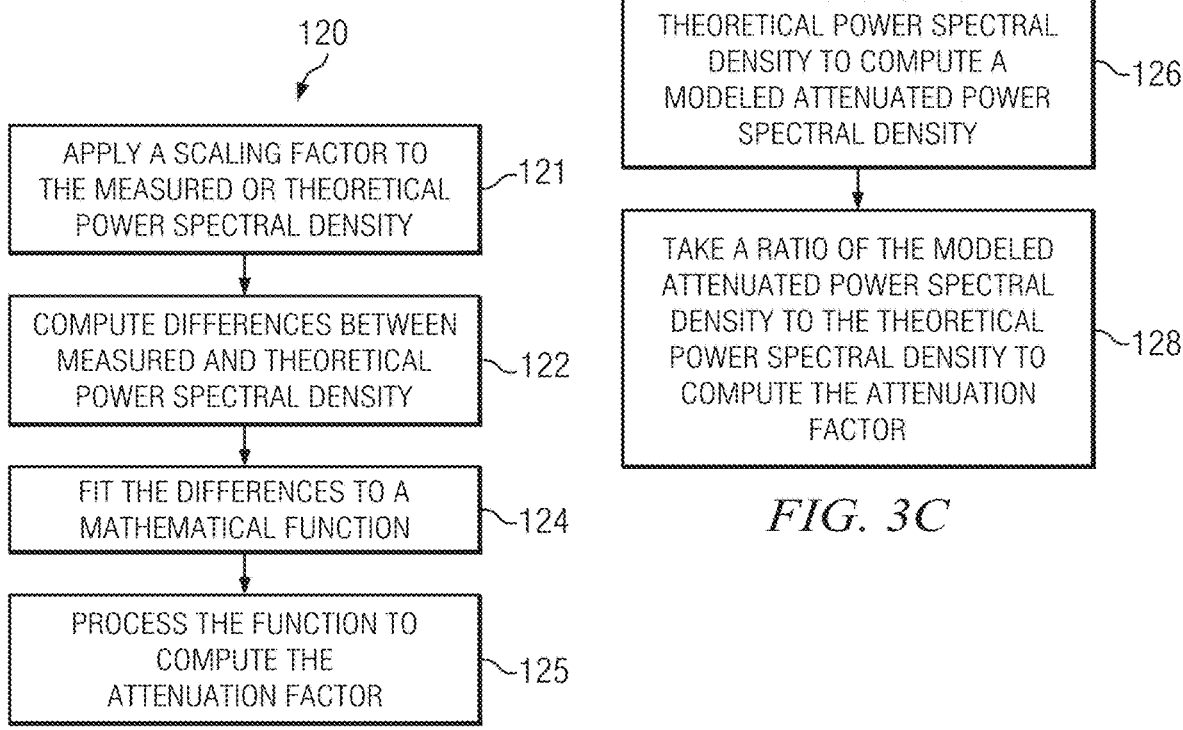
FIG. 3B
FIG. 3C

AUTOMATED CONFIGURATION OF TELEMETRY TRANSMISSION

CROSS REFERENCE TO RELATED APPLICATIONS

This application claims the benefit of, and priority to, U.S. Patent Application No. 63/179,610 entitled "Automated Configuration of Telemetry Transmission" filed Apr. 26, 2021, which is incorporated herein by this reference in its entirety.

BACKGROUND

Petroleum drilling operations commonly employ a number of techniques to gather information about the wellbore and the formation through which it is drilled. Such techniques are commonly referred to in the art as measurement while drilling (MWD) and logging while drilling (LWD). MWD and LWD techniques may be used, for example, to obtain information about the wellbore (e.g., information about the size, shape, and direction thereof) and the properties of the surrounding formation (e.g., the density, porosity, and resistivity thereof which may be related to the hydrocarbon bearing potential). Transmission of data from a downhole tool in the drill string to the surface is a difficulty common to many MWD and LWD operations.

Mud-pulse telemetry and electromagnetic (EM) telemetry are commonly used to transmit data from a downhole tool in a wellbore to a receiver at the surface. Both techniques may encode a very low frequency (VLF) carrier signal. Mud-pulse telemetry systems commonly include a rotary pulser including a rotor that restricts the flow of drilling fluid in the bottom hole assembly and thereby generates a pressure signal including a series of pressure pulses or a modulate pressure wave. The pressure signal is detected at the surface, for example, via a pressure transducer deployed in the standpipe. EM telemetry systems commonly include a downhole electric dipole antenna deployed on a drill collar and a surface receiving antenna.

One difficulty inherent in downhole telemetry communication is that the signal must be transmitted through several thousand feet of a highly attenuating medium (e.g., through the column of drilling fluid for mud-pulse telemetry or through the earth for EM telemetry). The received signal may therefore be highly attenuated such that achieving a sufficiently high signal to noise ratio (SNR) at a suitably high bandwidth (or data transmission rate) may be challenging.

SUMMARY

A method for configuring telemetry transmission of a downhole telemetry tool deployed in a subterranean wellbore is disclosed. The method includes receiving a telemetry signal at the earth's surface, the telemetry signal transmitted at a known carrier frequency from within a wellbore. A portion of the received signal is selected and processed to compute a measured power spectral density (PSD). A theoretical PSD is computed of the transmitted signal at the known carrier frequency and processed in combination with the measured PSD to compute an attenuation factor of the transmitted signal at a plurality of frequencies. A transmission configuration of the downhole telemetry tool may be changed in response to the computed attenuation factor. For example, one or more of the carrier frequency, bit rate, and amplitude of the transmitted signal may be adjusted in response to the attenuation factor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 3A to 3C depict flow charts of example processing methods for computing an attenuation factor at 120 in FIG. 2.

DETAILED DESCRIPTION

Disclosed embodiments relate generally to downhole telemetry operations and more particularly to a method for automatically configuring an electromagnetic telemetry transmitter or a mud-pulse telemetry transmitter. While downhole telemetry techniques have long been commercially employed, this application has identified a need for further improvement. For example, in some embodiments, there is a need to automatically measure and predict signal attenuation during a telemetry operation and to change the transmission configuration to optimize signal to noise and/or bandwidth.

A method for configuring telemetry transmission of a downhole telemetry tool deployed in a subterranean wellbore is disclosed. The method includes receiving a telemetry signal at the earth's surface, the telemetry signal transmitted at a known carrier frequency from within a wellbore. A portion of the received signal is selected and processed to compute a measured power spectral density (PSD). A theoretical PSD is computed of the transmitted signal at the known carrier frequency and processed in combination with the measured PSD to compute an attenuation factor of the transmitted signal at a plurality of frequencies.

The disclosed method(s) may advantageously provide for improved downhole telemetry operations. For example, the disclosed embodiments may advantageously enable manual or automatic adjustment of telemetry transmission parameters such as the carrier frequency, bit rate, and/or amplitude of the transmitted signal in response to signal attenuation and thereby optimize the signal to noise ratio of the received signal. The disclosed embodiments may further enable validation of telemetry modeling routines used to predict received signal amplitude. Moreover, the disclosed embodiments may advantageous be utilized for substantially any suitable downhole telemetry platform including mud-pulse telemetry and electromagnetic telemetry operations.

Figure 1:
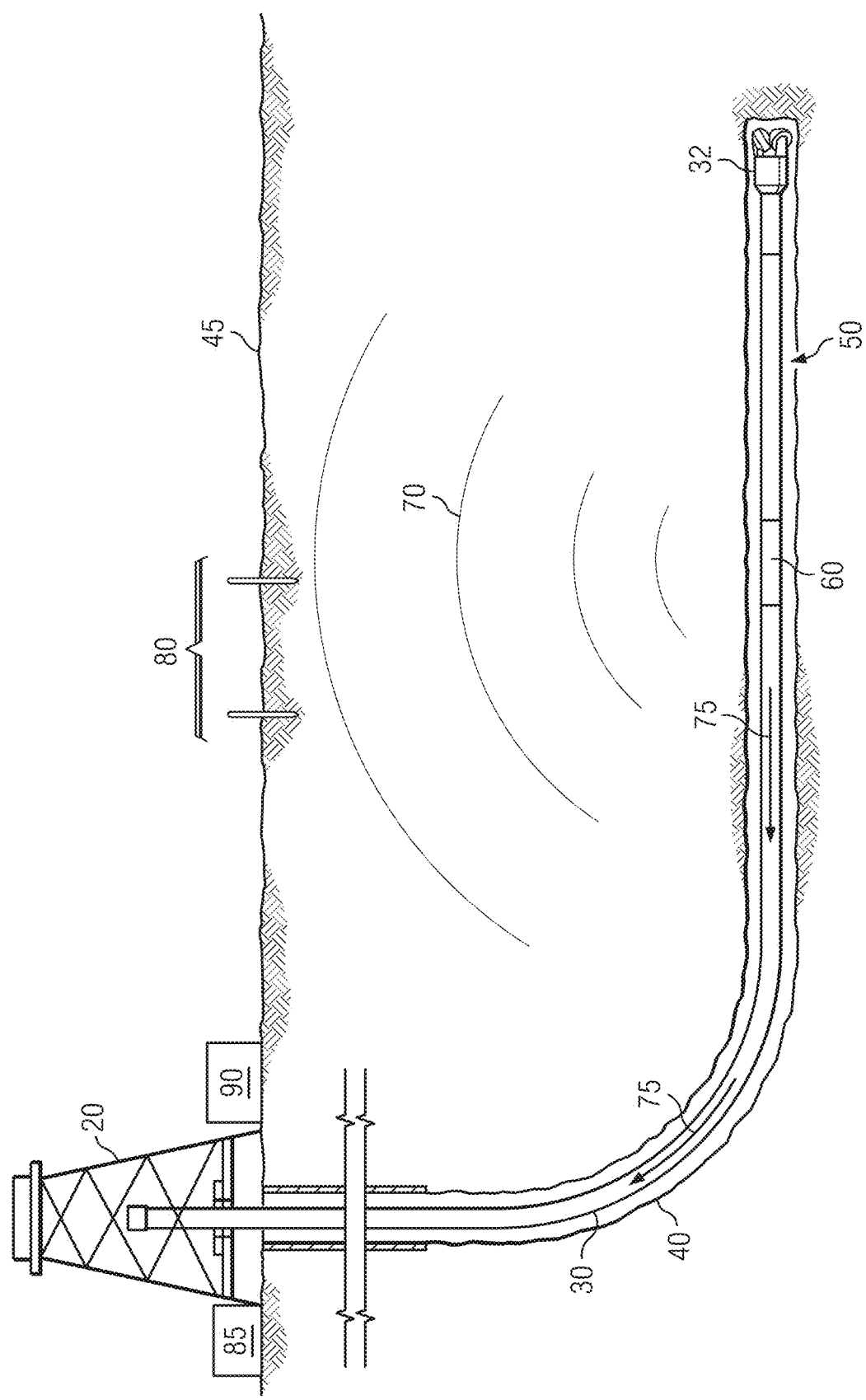
FIG. 1 depicts an example drilling rig on which disclosed embodiments may be utilized.

FIG. 1 depicts an example drilling rig 20 suitable for employing various method embodiments disclosed herein. The rig 20 may be positioned over a subterranean oil or gas formation and may include, for example, a derrick and a hoisting apparatus for lowering and raising a drill string 30 into and out of the wellbore 40. In some embodiments, the rig 20 is an offshore platform or drillship, such that the rig 20 is offset from the surface 45 by a depth of water. In the depicted embodiment the drill string 30 includes a drill bit 32 deployed at a distal end of a bottom hole assembly (BHA) 50. The BHA may include various downhole tools, for example, including a downhole drilling motor, a steering tool such as a rotary steerable tool or a bent sub, and one or more logging while drilling (LWD) and/or measurement while drilling (MWD) tools including various sensors for sensing downhole characteristics of the wellbore and the surrounding formation. It will be understood that the deployment illustrated on FIG. 1 is merely an example and that the disclosed embodiments are by no means limited to any particular drill string and/or BHA configuration.

With continued reference to FIG. 1, the BHA further includes a telemetry system 60, for example, associated with an MWD tool or an LWD tool. The telemetry system 60 may be configured to receive data from one or more MWD and/or LWD tools and to prepare the data for transmission to the surface. As is known to those of ordinary skill, such data preparation may include filtering, compressing, encoding, and/or digitizing the data. The encoding and digitizing may include any suitable modulation method to superimpose a digital bit pattern on a carrier wave, for example, phase shift keying (PSK), quadrature phase shift keying (QPSK), frequency shift keying, continuous phase modulation, quadrature amplitude modulation, orthogonal frequency division multiplexing (OFDM), and the like. It will be appreciated that while example embodiments described below employ QPSK encoding, the disclosed embodiments are in no way limited to any particular encoding scheme.

The telemetry system 60 may include substantially any suitable telemetry system, for example, including a mud-pulse telemetry system or an EM telemetry system including a transmitter such as a mud-pulse telemetry transmitter or an EM telemetry transmitter. A mud-pulse transmitter may include one or more valves to create positive pressure pulses in the drilling fluid. For example, in a rotary disc valve pulser, a control circuit activates a motor that rotates a rotor relative to a stator. The rotor and stator may include windows (apertures) that permit flow when rotationally aligned and restrict flow when misaligned. Rotation of the rotor periodically restricts the flow of drilling fluid (via periodic alignment and misalignment of the windows) and thereby generates the positive pressure pulses (schematically depicted at 75 in FIG. 1). The rotor may be rotated continuously in one direction (e.g., as in a mud siren), incrementally in one direction only, or incrementally by oscillating the rotor in one direction and then back to its original position. The disclosed embodiments are expressly not limited in this regard.

An EM telemetry transmitter may include, for example, an electric dipole antenna formed by an insulated gap between conductive drill collar segments on the drill string 30 or by a toroid deployed about an outer surface of a drill collar in the string 30. During transmission an encoded carrier signal (e.g., at a preselected carrier frequency) may be applied as a time-varying voltage differential between upper and lower conductive drill collar segments (and therefore across the insulating gap). As is known to those of ordinary skill in the art, the applied voltage differential induces a time-varying electrical current that emanates out into the subterranean formation, for example, as an electromagnetic wave as depicted schematically at 70, a portion of which may be detected at the surface 45.

The transmitted telemetry signal 70, 75 may be detected at the surface using appropriately configured surface sensors. For example, mud-pulse telemetry signals may be detected using one or more pressure transducers deployed on the standpipe (the deployment is depicted schematically at 85). Deployment and configuration of transducers for detecting mud-pulse telemetry signals is well known.

EM surface sensors 80 may include substantially any suitable sensors including, for example, electrodes, magnetometers, capacitive sensors, current sensors, hall probes, gap electrodes, toroidal sensors, etc. The sensors 80 may be positioned in and/or configured to detect signals from a single wellbore or multiple wellbores and may operate on land or in marine environments. The sensors 80 may communicate uni-directionally or bi-directionally. The sensors 80 may use automation, downlinking, noise cancellation, etc., and may operate with acquisition software and/or human operators. The disclosed embodiments are not limited in any of these regards.

In one suitable example, the sensors 80 may include one or more metallic stakes deployed at the surface 45 (e.g., inserted into the ground). In some embodiments with an offshore rig, the sensors 80 are deployed at the surface 45 of the sea or ocean and below where the rig is located. Additionally, or in the alternative, the sensors 80 may be deployed on another rig or remote station at the surface 45. Such sensors may be configured to detect the transmitted wave 70 and/or a voltage difference between a plurality of metallic stakes. In some embodiments, one or more of the sensors 80 may be deployed within the wellbore 40 (e.g., in contact with a casing), within a different wellbore (not shown), coupled to a blow-out preventer (not shown) or some other electrically conductive structure at the surface, or the like. For example, EM sensor 80 may include a proximity electrode deployed in a nearby wellbore as disclosed in U.S. Patent Publication 2020/0200939.

The current and/or voltage difference may be measured at the sensors 80 using an analog to digital converter (ADC) (not shown) connected to the sensors 80. The ADC output may be received by a surface control system 90 at the surface 45 for recording and processing. Such processing may include known decoding techniques. The surface processing may further include the claimed methods described in more detail below with respect to FIGS. 2-7.

It will be appreciated that the EM transmitter and receiver configurations described above are merely examples of which the disclosed embodiments are not limited. Those of ordinary skill will readily be able to conceive of and make use of other transmitter and receiver configurations.

Figure 2:
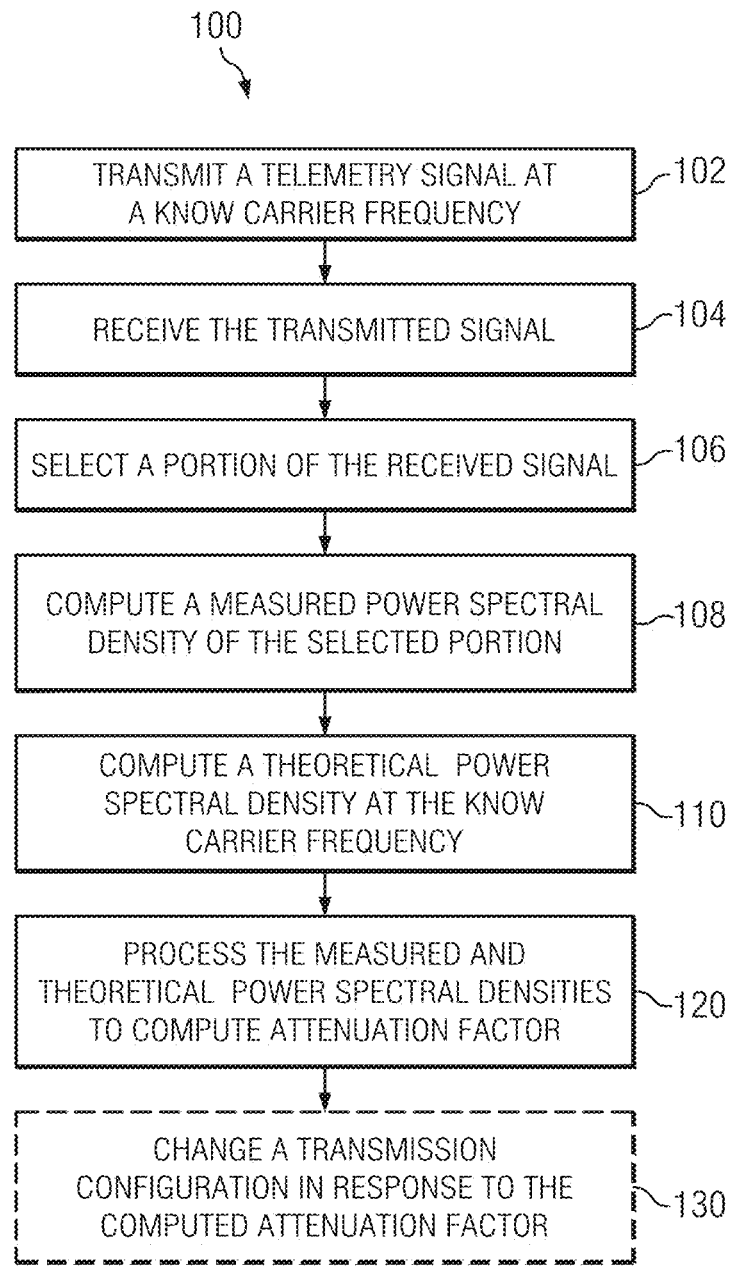
FIG. 2 depicts a flow chart of one disclosed method embodiment.

FIG. 2 depicts a flow chart of one disclosed method embodiment 100 for configuring a telemetry transmitter. A telemetry signal is transmitted at a known carrier frequency and bit rate at 102, for example, by applying a time varying voltage difference across an insulating gap in a drill string for an EM telemetry operation. The transmitted signal is received at a surface sensor at 104, for example, via measuring a time varying voltage difference between first and second surface stakes (or by measuring standpipe pressure in a mud-pulse telemetry operation). A portion of the received signal is selected at 106. A measured power spectral density (PSD) of the signal portion selected in 106 is computed at 108. A theoretical PSD of the known carrier frequency and bit rate is computed at 110. The measured PSD and the theoretical PSD are processed in combination at 120 to compute an attenuation factor of the transmitted signal (e.g., as it is propagates through the earth or through the column of drilling fluid to the receiver). In some embodiments, a transmission configuration of the transmitter may be changed in response to the computed attenuation factor at 130. For example, at least one of the carrier frequency, the bit rate, and the amplitude of the transmitted signal may be changed in response to the computed attenuation factor.

With continued reference to FIG. 2, the telemetry signal may be transmitted at substantially any suitable carrier frequency. For example, the carrier frequency may be in a range from about 0.5 to about 40 Hz. The transmitted signal may be modulated using substantially any suitable modulation techniques, for example, as described above with respect to FIG. 1. In one example embodiment QPSK modulation may be utilized.

A portion of the received signal having a high SNR (or relatively high as compared to other portions of the received signal) may be selected at 106. For example, a portion of the received signal having an SNR greater than a predetermined threshold may be selected. In one embodiment, the selected portion may be obtained during a static surveying operation after drilling has temporarily stopped (and when the drill string is not rotating and lifted off bottom). Those of ordinary skill will readily appreciate that static surveys are commonly made when a new length of drill pipe is added to the drill string at approximately 30 to 90 foot depth intervals.

As noted above a power spectral density (PSD) of the selected portion may be computed at 108. It will be understood that the power spectrum of a time based signal represents the distribution of power into frequency components (i.e., the PSD is a measure of signal power content as a function of frequency). The PSD may be obtained using substantially any suitable mathematical techniques, for example, including known Fourier analysis techniques. The theoretical PSD at the known carrier frequency may be computed using the same mathematical techniques.

The measured PSD and the theoretical PSD are processed in combination at 120 to compute an attenuation factor of the received signal. As used herein the term attenuation factor refers to signal attenuation at any particular frequency relative to signal attenuation at a reference frequency (e.g., with respect to the carrier frequency). Using this definition the attenuation factor is defined to equal 1 at the reference frequency. For example, the attenuation factor may include a plurality of attenuation factors at a corresponding plurality of frequencies indicating signal attenuation at those frequencies relative to the signal attenuation at the reference frequency. In certain embodiments, the attenuation factor may be a logarithmically linear function (as the plot is in a semi-logarithmic linear regression) thereby indicating that attenuation versus frequency is an exponential growth/decay as described in more detail below.

FIGS. 3A-3C depict various methods for computing the attenuation factor at 120 in FIG. 2. In FIG. 3A, processing the measured PSD and the theoretical PSD at 120 includes applying a scaling factor to the measured PSD or the theoretical PSD at 121 such that an amplitude of the measured PSD is substantially equal to the amplitude of the theoretical PSD at the carrier frequency. After scaling in 121, mathematical differences between the measured PSD and the theoretical PSD are computed at a plurality of frequencies at 122 (e.g., at a plurality of side lobes). These differences may then be processed in 123 to compute the attenuation factor(s).

In FIG. 3B, processing the measured PSD and the theoretical PSD at 120 includes applying a scaling factor to the measured PSD or the theoretical PSD at 121 such that an amplitude of the measured PSD is substantially equal to the amplitude of the theoretical PSD at the carrier frequency. After scaling in 121, mathematical differences between the logarithmic values of the measured PSD and the logarithmic values of the theoretical PSD are computed at a plurality of frequencies at 122. The differences in the logarithmic values may then be fit to a mathematical function in a selected frequency range at 124. For example, a frequency range may be automatically selected to exclude the noise effects in the measured PSD and subsequent differences in the logarithmic values, such that the differences may be fit to a linear function within a predetermine threshold. This function (e.g., the linear function) may be further processed to compute the attenuation factor(s) at 125.

In FIG. 3C, processing the measured PSD and the theoretical PSD at 120 includes applying a scaling factor to the measured PSD or the theoretical PSD at 121 such that an amplitude of the measured PSD is substantially equal to the amplitude of the theoretical PSD at the carrier frequency. After scaling in 121, mathematical differences between the logarithmic values of the measured PSD and the logarithmic values of the theoretical PSD are computed at a plurality of frequencies at 122. The differences in the logarithmic values may then be fit to a mathematical function in a selected frequency range at 124. For example, a frequency range may be selected, as described above, such that the differences may be fit to a linear function. The fitting function may then be added to the theoretical PSD in the selected frequency range to compute a modeled attenuated PSD at 126. The attenuation factor(s) may be computed in 128, for example, by taking a ratio of the modeled attenuated PSD to the theoretical PSD at the frequencies of interest.

Figure 4A:
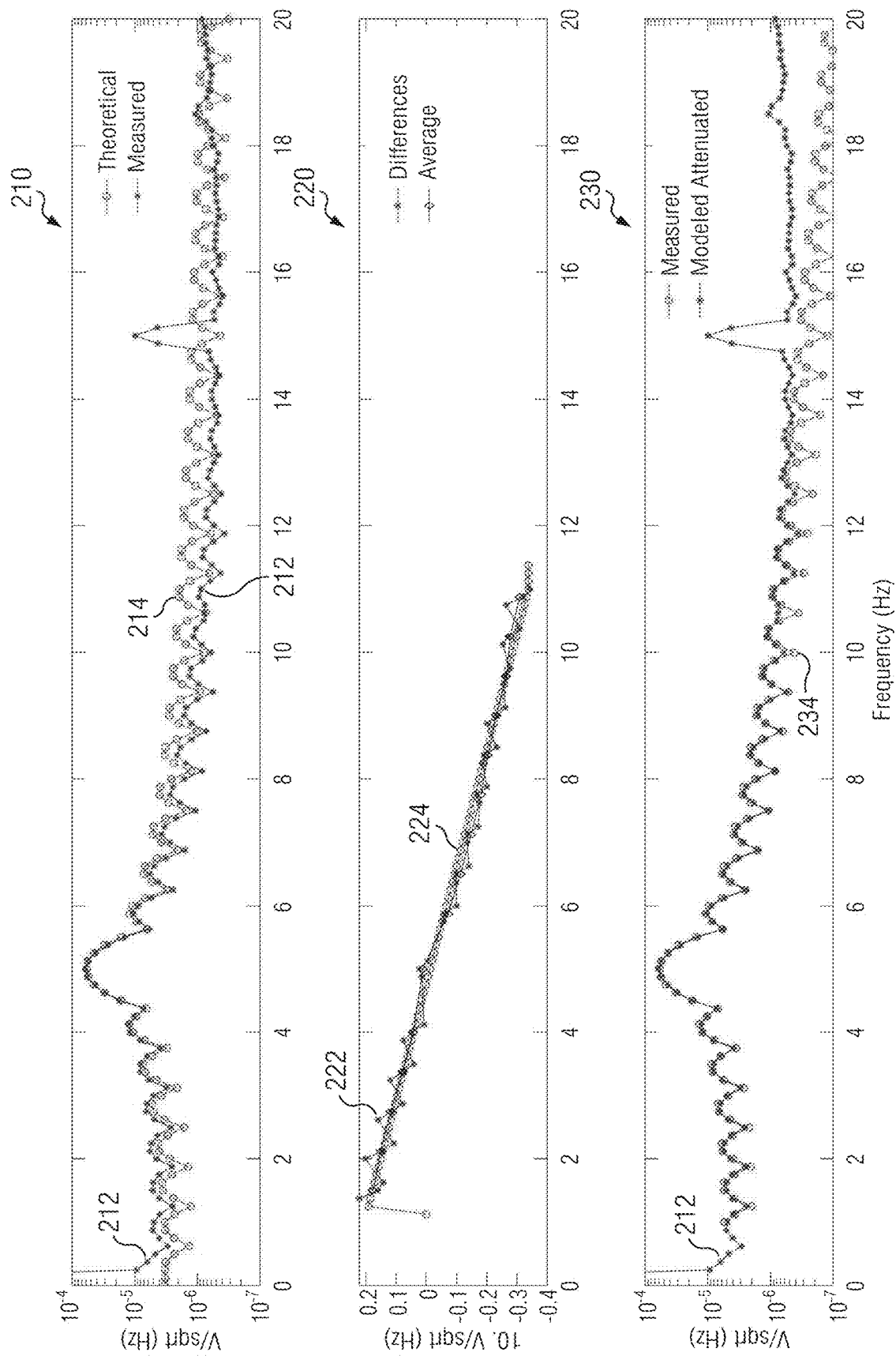
FIGS. 4A and 4B depict one example EM telemetry implementation of the method disclosed on FIGS. 2 and 3A-3C.
Figure 4B:
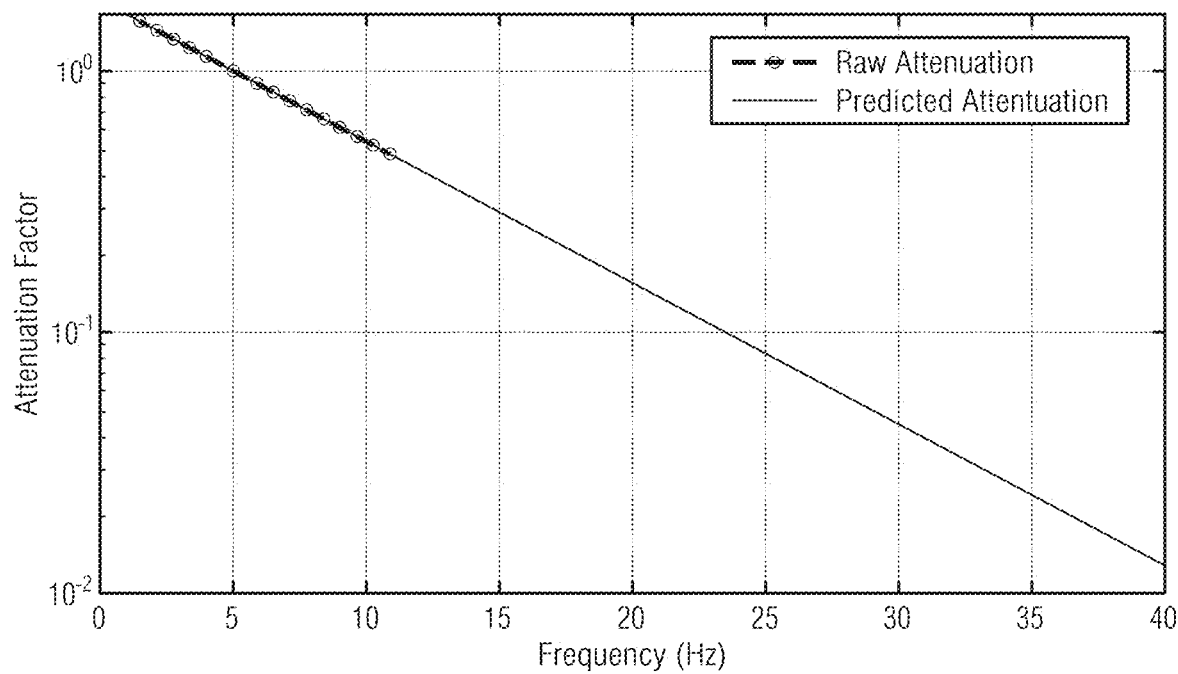

FIGS. 4A and 4B depict one example EM telemetry implementation of method 100 as depicted on FIGS. 2 and 3A-3C. FIG. 4A depicts plots of amplitude (in units of volts per square root Hz) versus frequency in Hz. The first trace in FIG. 4A (at 210) depicts the square root of the measured PSD 212 and the square root of the theoretical PSD 214 computed at 108 and 110 of FIG. 2. In this particular example, the carrier frequency was 5 Hz and the bit rate was 1.25 bits per second (bps) for a QPSK modulated signal. It will be appreciated that the process of encoding data into a QPSK wave has the effect of spreading the energy of the wave across a range of frequencies. The frequency at which the energy is centered is referred to as the carrier frequency. Most of the EM power is in the main lobe (at the carrier frequency). The lobes at frequencies above and below the main lobe are referred to as side lobes.

With continued reference to FIG. 4A, the main lobe (the carrier frequency) is shown at 5 Hz with side lobes at 3.4 Hz, 4.1 Hz, 5.9 Hz, 6.6 Hz, etc. Note also that the signal in this example exhibits a noise peak at about 15 Hz. As depicted, the square root of the theoretical PSD has been scaled (as described at 121 of FIGS. 3A-3C) so that the amplitude of the measured PSD is substantially equal to the amplitude of the theoretical PSD at the carrier frequency (note that the amplitudes are equal in the main lobe).

With continued reference to trace 210 in FIG. 4A, note that the side lobe peaks in the theoretical PSD 214 (in red) are symmetrical about the main lobe. In contrast, the side lobe peaks of the measured PSD 212 (in blue) are asymmetrical about the main lobe such that the amplitudes of the side lobe peaks in the measured PSD 212 are greater than the amplitudes of the side lobe peaks in the theoretical PSD 214 at frequencies less than the carrier frequency and less the amplitudes of the side lobe peaks in the theoretical PSD 214 at frequencies greater than the carrier frequency. This indicates increasing signal attenuation with increasing frequency.

FIGS. 3A-3C disclose computing differences between the measured and theoretical PSD at 122 and fitting the differences to a mathematical function at 124. These differences are depicted in the second trace of FIG. 4A at 220 (where 222 depicts the difference between the measured PSD 212 and the theoretical PSD 214 at the side lobes). In this example, the differences are computed at three distinct frequencies per side lobe (open circles). The averages of these three differences are further computed to obtain an average difference for each side lobe (open diamonds). The average differences are fit to a linear function 224 (in red) over a selected frequency range (about 1.5 to about 11 Hz in this example).

The third trace 230 of FIG. 4A depicts the measured PSD 212 and a modeled attenuated PSD 234 (in red) which is obtained by computing a sum of the fitting function 224 and the theoretical PSD 214. Note that amplitudes of the main lobe and side lobes are substantially aligned over the frequency range from about 1.5 Hz to about 11 Hz. As described above with respect to 128 in FIG. 3C, the attenuation factors may be computed via dividing the amplitude of the modeled attenuated PSD (e.g., as depicted at 234) by the amplitude of the theoretical PSD (e.g., as depicted at 214) at a plurality of frequencies.

FIG. 4B depicts a plot of the attenuation factors computed from the data depicted on FIG. 4A versus frequency. In this example the attenuation factors were computed at each of the side lobe peaks shown on FIG. 4A. Note that the log of the attenuation factor decreases linearly with the increasing frequency. The linear fit shown at 240 may be used to interpolate or extrapolate the attenuation factor at substantially any suitable other frequency of interest (e.g., in a range from about 0.5 Hz to about 35 Hz).

With continued reference to FIGS. 2 through 4B note that the computed attenuation factor quantifies the signal attenuation at any particular frequency relative to signal attenuation at a reference frequency. In the example described above with respect to FIGS. 4A and 4B, the attenuation factor provides a ratio of signal attenuation at any particular frequency relative to the signal attenuation at 5 Hz (the carrier frequency).

Figure 5B:
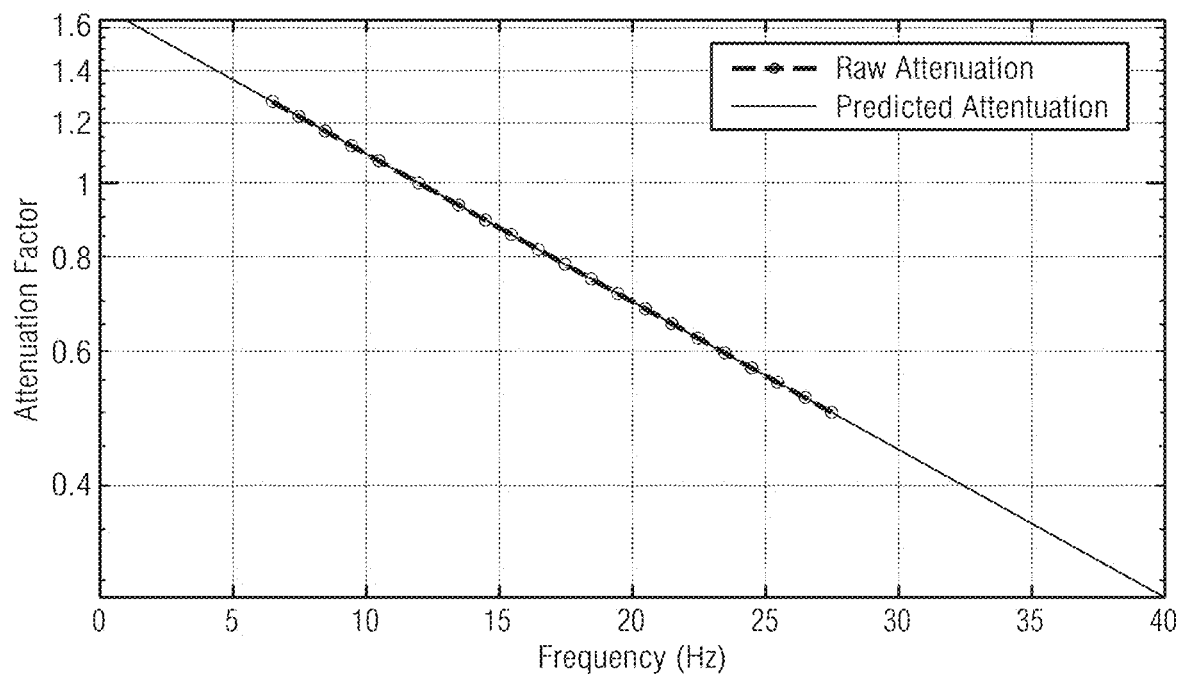
FIGS. 5A and 5B depict another example EM telemetry implementation of the method disclosed on FIGS. 2 and 3A-3C.
Figure 5A:
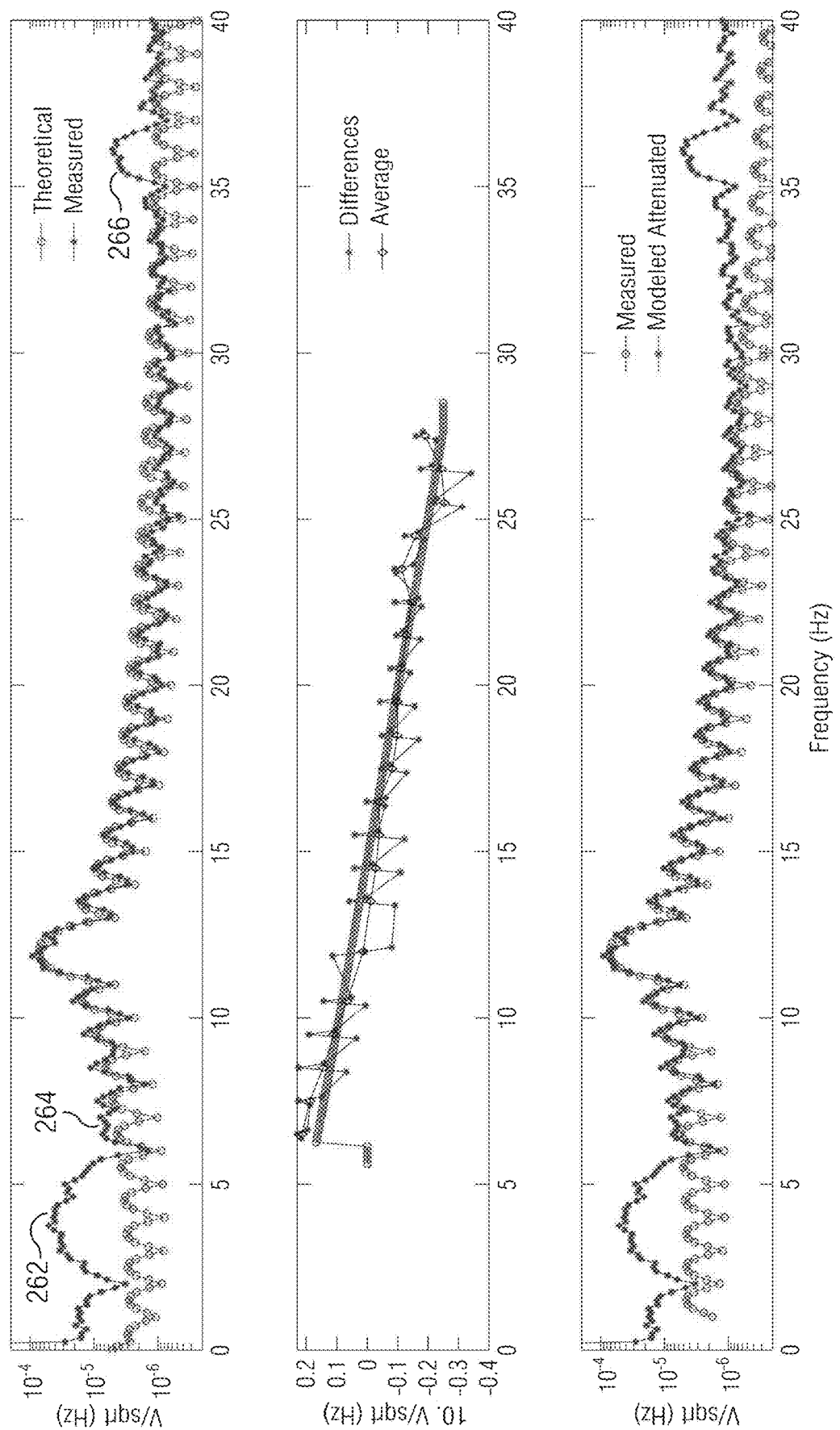

FIGS. 5A and 5B depict another example EM telemetry implementation of method 100 as depicted on FIGS. 2 and 3A-3C in which the carrier frequency was 12 Hz and the bit rate was 2 bits per second for a QPSK signal. The main lobe (the carrier frequency) is shown at 12 Hz with side lobes at 8.5 Hz, 9.5 Hz, 10.5 Hz, 13.5 Hz, 14.5 Hz, 15.5 Hz, and etc. In this example, there was another EM MWD tool nearby transmitting a signal having a carrier frequency of 4 Hz at 4 bits per second. As depicted, this interference contaminated the received signal with a broad interference peak 262 centered at about 4 Hz and an irregular side lobe 264 centered at about 7 Hz. The received signal also included narrow band noise 266 centered at about 36 Hz. However, despite this interference/noise, the disclosed method is robust enough to determine the attenuation factor over a broad frequency range (from about 6 to about 27 Hz) as depicted on FIGS. 5A and 5B using the same procedure described above with respect to the example depicted on FIGS. 4A and 4B.

Figure 6A:
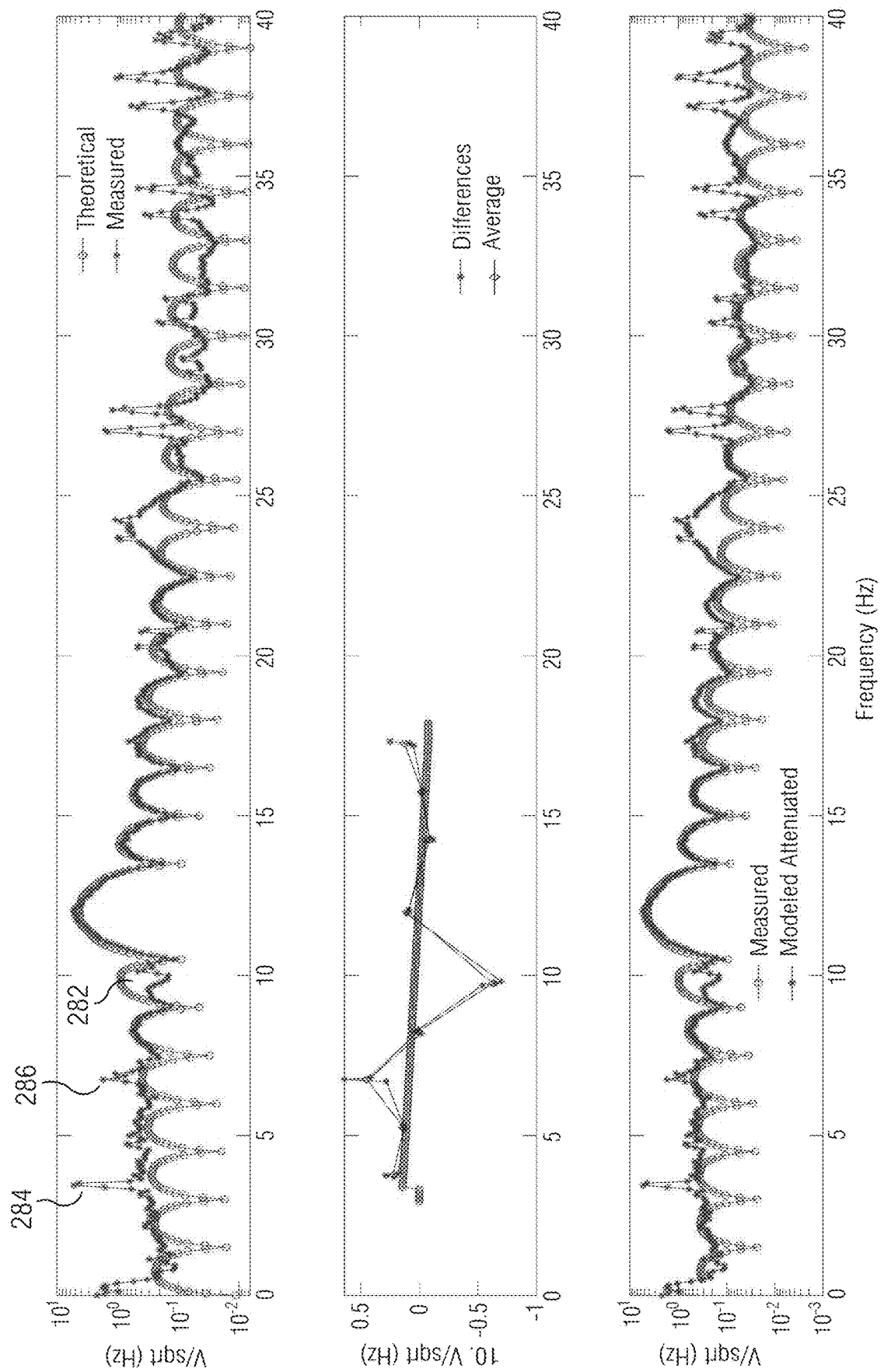
FIGS. 6A and 6B depict an example mud-pulse telemetry implementation of the method disclosed on FIGS. 2 and 3A-3C.
Figure 6B:
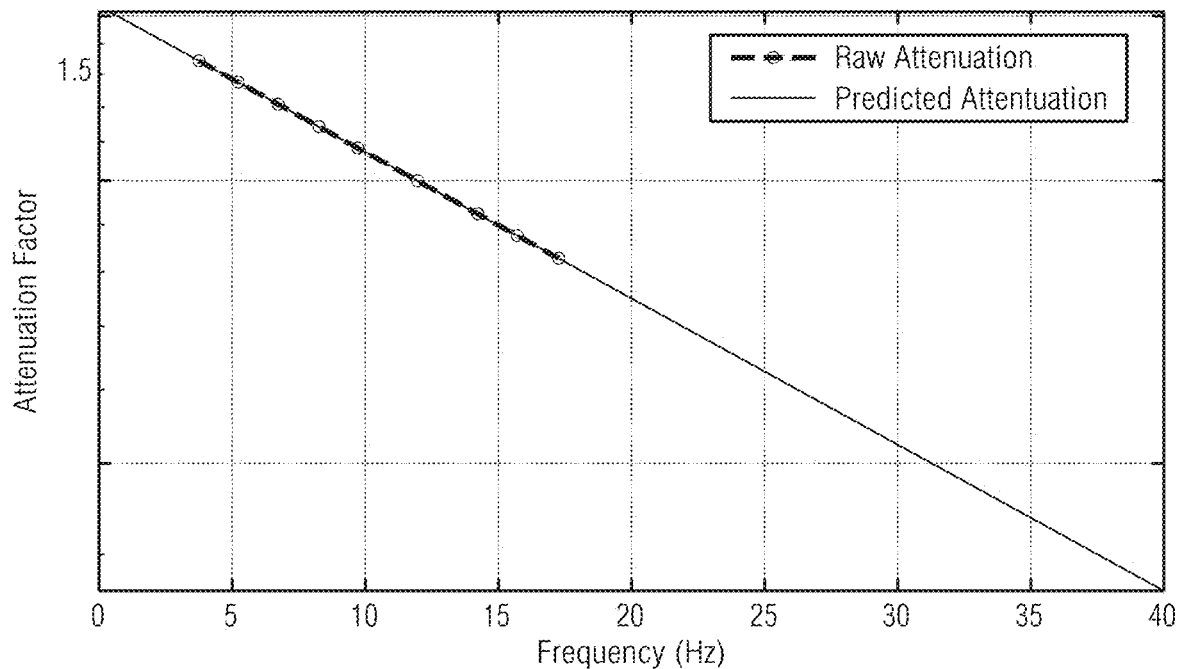

FIGS. 6A and 6B depict an example mud-pulse telemetry implementation of method 100 as depicted on FIGS. 2 and 3A-3C in which the carrier frequency was 12 Hz and the bit rate was 3 bits per second for a QPSK signal. The main lobe (the carrier frequency) is shown at 12 Hz with first and second side lobes on either side at 8.25 Hz, 9.75 Hz, 14.25 Hz, and 15.7 Hz. Interpreting the PSD for a received mud pulse telemetry signal can be more complicated than for a similar EM telemetry signal. For example, mud pulse telemetry signals commonly include "nulls" as indicated by a decrease in signal amplitude at a characteristic frequency. In this example, a null is observed at about 10 Hz as depicted at 282. It was likely caused by echoes and/or reflections of the pressure wave as it traveled through pipe fittings having different diameters.

Interpreting the received mud pulse telemetry signals can be further complicated by pressure variations caused by the surface pumps, for example, including various harmonics. In this example pump harmonic noise is observed at about 3.5 Hz and 7 Hz, as indicated by narrow noise peaks at 284 and 286. Numerous noise peaks are also observed at higher frequencies. While not employed in this example, noise cancellation techniques, for example, based on a Kalman Filter, may be used to mitigate or remove the harmonic noise, prior to the attenuation analysis.

Despite the interference/noise and nulls inherent in mud pulse telemetry signals, the disclosed method is robust enough to determine the attenuation factor over a broad frequency range (from about 4 to about 17 Hz) as depicted on FIGS. 6A and 6B using the same procedure described above with respect to the example depicted on FIGS. 4A and 4B.

With reference again to FIG. 1, in some embodiments, the computed attenuation factors be processed to change a transmission configuration of the transmitted telemetry signal (e.g., the transmitted EM or mud-pulse signal). For example, at least one of the carrier frequency, the bit rate, and the amplitude of the transmitted signal may be adjusted in response to the computed attenuation factor(s). The amplitude of the signal may be increased or decreased in response to the attenuation factors. At high attenuation the amplitude may be increased to increase signal to noise ratio and at low attenuation the amplitude may be decreased to preserve downhole power (such as battery power). Moreover, the carrier frequency and/or bit rate may be changed, for example, to reduce signal attenuation and therefore increase the signal to noise ratio.

In some embodiments, attenuation factor is an important parameter for spectrum estimation for MWD telemetry in a well system. To derive a noise estimate for the uplink telemetry signal (the signal transmitted by the telemetry transmitter), the uplink telemetry signal may be compensated using a power-based compensation or a time-domain compensation, both requiring attenuation factors for appropriate compensation at different frequencies. Moreover, to estimate signal to noise ratios from a list of different modulation candidates including different and/or multiple carrier frequencies and their bit rates, the effective signal to noise ratio may be computed by injecting a signal, whose strength may be estimated by attenuation factors, into the noise estimate. Furthermore, optimal modulation settings may be selected. For example, the modulation settings with the highest signal to noise ratio, or a signal to noise ratio greater than a threshold value with the highest bit rate, when compared to other modulation settings, may be selected.

Figure 7:
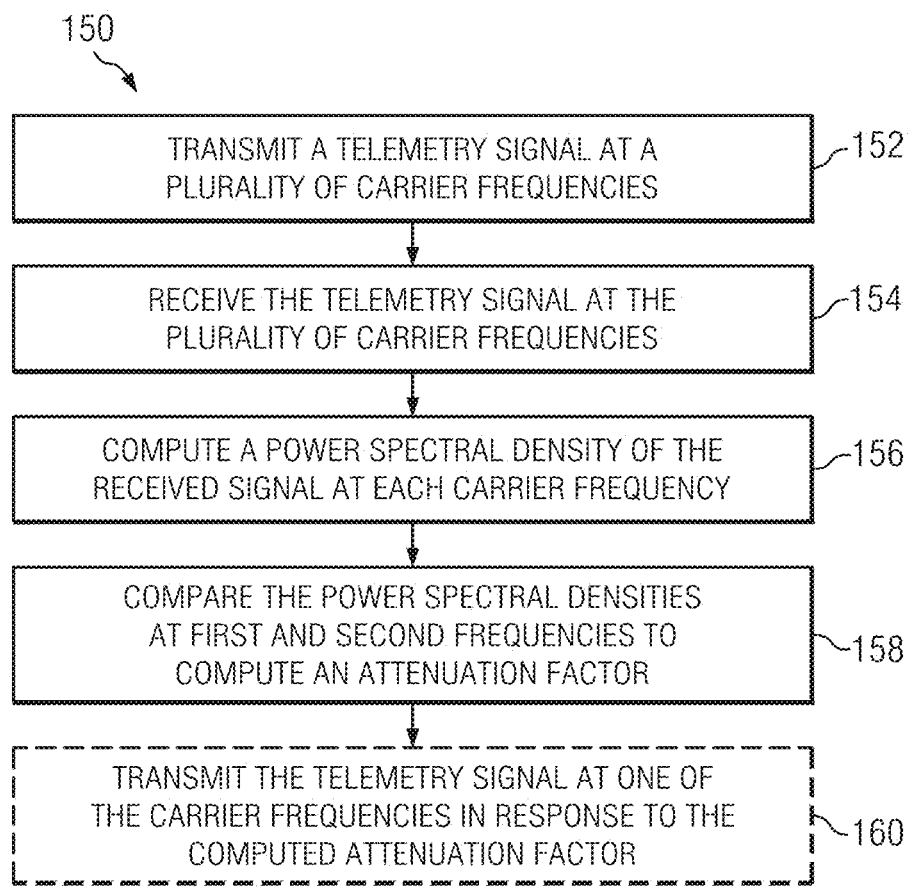
FIG. 7 depicts a flow chart of another disclosed method embodiment.

FIG. 7 depicts a flow chart of another disclosed method 150 for configuring a telemetry transmitter. A signal is transmitted at a plurality of known carrier frequencies at 152. The transmission may include a known sequence of bits, for example, a pseudo random sequence. This repeating pseudo random sequence transmission may advantageously enable better matching of the PSD at the various frequencies as described below. In one example embodiment, a plurality of signals, each having a distinct carrier frequency, are sequentially transmitted. In another embodiment, a signal having multiple frequencies may be employed. For example, a multiplexed signal may include two or more frequencies. Likewise a signal having high harmonic content, such as a square wave, may be transmitted. The transmitted signal(s), including the plurality of carrier frequencies, is/are received at a surface sensor at 154, for example, as described above with respect to FIG. 2.

With continued reference to FIG. 7, a power spectral density (PSD) of the received signal is computed at each of the plurality of carrier frequencies at 156. For example, portions of the received signal may be selected corresponding to each of the carrier frequencies. A PSD may then be computed for each portion. The computed PSDs may then be compared at 158 to compute an attenuation factor. For example, a first PSD computed at a first carrier frequency may be compared with a second PSD computed at a corresponding second carrier frequency to compute the attenuation factor. In one example embodiment, a ratio between the PSD amplitudes at the first and second frequencies is taken to be the relative signal attenuation at the first frequency with respect to the second frequency.

With reference again to FIG. 1, the received EM signal may be processed using the surface control system 90. control system 90 may include one or more processor-based computing systems. In the present context, a processor or processor-based computing system may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for example, workflows and the like for carrying out a drilling operation, algorithms and routines for processing data received at the surface from the BHA 50, and the like. The surface control system 90 may be in electrical or electronic communication with the receiver(s) 80 (the connection is not shown in FIG. 1) and may include circuitry (not shown separately on FIG. 1) for receiving and decoding signals induced the receiver as a result of the transmitted EM telemetry signals. The control system may further include instructions for executing method steps 106 through 120 shown on FIGS. 2 and 3A-3C as well as steps 156 and 158 shown on FIG. 6.

The disclosure includes numerous embodiments and combinations of embodiments. These embodiments include, but are not limited to, the following embodiments.

In a first embodiment, a method for configuring telemetry transmission of a downhole telemetry tool deployed in a subterranean wellbore is disclosed. The method includes (a) receiving a telemetry signal at the earth's surface, the telemetry signal transmitted at a known carrier frequency from within a subterranean wellbore using a downhole telemetry tool, the received signal including a telemetry signal and noise; (b) selecting a portion of the received signal; (c) computing a measured power spectral density (PSD) of the portion selected in (b); (d) computing a theoretical power spectral density (PSD) of the transmitted signal at the known carrier frequency; and (e) processing the measured PSD computed in (c) in combination with the theoretical PSD computed in (d) to compute an attenuation factor of the transmitted signal at a plurality of frequencies.

A second embodiment may include the first embodiment and further include (f) changing a transmission configuration of the telemetry tool in response to the attenuation factor computed in (e).

A third embodiment may include the second embodiment wherein (f) includes changing at least one of a carrier frequency, a bit rate, and an amplitude of the transmitted signal.

A fourth embodiment may include any one of the first through the third embodiments wherein (a) includes: (i) causing the telemetry tool to transmit an electromagnetic signal at the known carrier frequency; and (ii) receiving the transmitted telemetry signal at the earth's surface.

A fifth embodiment may include any one of the first through the fourth embodiments wherein the telemetry signal received in (a) is a mud-pulse telemetry signal or an electromagnetic telemetry signal.

A sixth embodiment may include any one of the first through the fifth embodiments wherein the portion of the signal selected in (b) is transmitting during a static surveying operation.

A seventh embodiment may include any one of the first through the sixth embodiments wherein the portion of the signal selected in (b) is transmitting during a drilling operation such that the selected portion has a signal to noise ratio greater than a predetermined threshold.

A eighth embodiment may include any one of the first through the seventh embodiments wherein the theoretical PSD is computed in (d) based on quadrature phase shift keying (QPSK) modulation for a transmitted signal at the known carrier frequency and having an identical bit rate to the signal received in (a).

A ninth embodiment may include any one of the first through the eighth embodiments wherein the processing in (e) further includes: (i) applying a scaling factor to the measured PSD computed in (c) or the theoretical PSD computed in (d) such that an amplitude of the measured PSD substantially equals an amplitude of the theoretical PSD at the carrier frequency; (ii) computing a difference between the measured PSD and the theoretical PSD at each of the plurality of frequencies; and (iii) processing the differences computed in (ii) to determine the attenuation factors.

A tenth embodiment may include any one of the first through the eighth embodiments wherein the processing in (e) further includes:(i) applying a scaling factor to the measured PSD computed in (c) or the theoretical PSD computed in (d) such that an amplitude of the measured PSD substantially equals an amplitude of the theoretical PSD at the carrier frequency; (ii) computing a difference between the measured PSD and the theoretical PSD at each of the plurality of frequencies; (iii) fitting the differences to a mathematical function in a selected frequency range; and (iv) processing the function to compute the attenuation factors at the plurality of frequencies.

An eleventh embodiment may include any one of the first through the eighth embodiments wherein the processing in (e) further includes: (i) applying a scaling factor to the measured PSD computed in (c) or the theoretical PSD computed in (d) such that an amplitude of the measured PSD substantially equals an amplitude of the theoretical PSD at the carrier frequency; (ii) computing a difference between the measured PSD and the theoretical PSD at each of a plurality of frequencies; (iii) fitting the differences to a mathematical function in a selected frequency range; and (iv) adding the function to the theoretical PSD in the selected frequency range to compute a modeled attenuated PSD; and (v) taking a ratio of the modeled attenuated PSD to the theoretical PSD to compute the attenuation factors at the plurality of frequencies.

A twelfth embodiment may include any one of the ninth through the eleventh embodiments wherein the differences are computed in (ii) at frequencies corresponding to at least one side lobe peak above and below the carrier frequency in the measured PSD and the theoretical PSD.

A thirteenth embodiment may include any one of the tenth through the eleventh embodiments wherein the mathematical function is a linear function.

A fourteenth embodiment may include the eleventh embodiment wherein the frequency range is automatically selected in (iii) such that a linear mathematical function achieves the fit within a predetermined threshold.

A fifteenth embodiment may include the eleventh embodiment wherein (e) further includes: (vi) fitting the attenuation factors to a function; (vii) processing the function to compute an attenuation factor at a frequency other than the plurality of frequencies.

A sixteenth embodiment may include any one of the first through the fifteenth embodiments wherein (a) further includes demodulating the telemetry portion to extract transmitted data.

In a seventeenth embodiment a method for configuring an electromagnetic telemetry transmission of a downhole telemetry tool deployed in a subterranean wellbore is disclosed. The method includes (a) receiving a telemetry signal at the earth's surface, the telemetry signal transmitted at a known carrier frequency from within a subterranean wellbore using a downhole telemetry tool; (b) computing a measured power spectral density (PSD) of the signal received in (a); (c) computing a theoretical power spectral density (PSD) of the transmitted signal at the known carrier frequency; (d) applying a scaling factor to the measured PSD computed in (b) or the theoretical PSD computed in (c) such that an amplitude of the measured PSD substantially equals an amplitude of the theoretical PSD at the carrier frequency; (e) computing a difference between the measured PSD and the theoretical PSD at each of a plurality of frequencies; (f) fitting the differences to a mathematical function in a selected frequency range; (g) adding the function to the theoretical PSD in the selected frequency range to compute a modeled attenuated PSD; and (h) taking a ratio of the modeled attenuated PSD to the theoretical PSD to compute attenuation factors at the plurality of frequencies.

An eighteenth embodiment may include the seventeenth embodiment and further include (i) fitting the attenuation factors to a function and (j) processing the function to compute an attenuation factor at a frequency other than the plurality of frequencies.

In a nineteenth embodiment a method for configuring an electromagnetic transmission of a downhole telemetry tool deployed in a subterranean wellbore is disclosed. The method includes (a) receiving a telemetry signal at the earth's surface, the telemetry signal transmitted from within a subterranean wellbore using a downhole telemetry tool at a plurality of known frequencies or including a plurality of known frequencies (b) computing power spectral densities of the received signal at each of the frequencies; and (c) comparing the power spectral densities at first and second of the plurality of frequencies to compute an attenuation factor of the transmitted signal.

A twentieth embodiment may include the nineteenth embodiment wherein (c) includes computing a ratio of power spectral density amplitudes of the first frequency to the second frequency to compute the attenuation factor.

A twenty-first embodiment may include any one of the nineteenth and twentieth embodiments and may further include (d) changing at least one of a carrier frequency, a bit rate, and an amplitude of the transmitted signal in response to the attenuation factor computed in (c).

Although methods automatically configuring electromagnetic telemetry transmission have been described in detail, it should be understood that various changes, substitutions and alternations can be made herein without departing from the spirit and scope of the disclosure as defined by the appended claims. These described embodiments are examples of the presently disclosed techniques. In an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. Terms such as up, down, top and bottom, and other like terms should be understood to be relative positions to a given point and may be utilized to more clearly describe some features. Commonly, these terms relate to a reference point such as the surface from which drilling operations are initiated.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, or within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Although only a few example embodiments have been described in detail above, those skilled in the art will readily appreciate that many modifications are possible in the example embodiments without materially departing from this invention. Accordingly, all such modifications are intended to be included within the scope of this disclosure.

The invention claimed is:

1. A method for configuring telemetry transmission of a downhole telemetry tool deployed in a subterranean wellbore, the method comprising:
   (a) receiving an electromagnetic telemetry signal at a surface of the Earth during a process of drilling the subterranean wellbore, the electromagnetic telemetry signal transmitted at a known carrier frequency, ranging from 0.5 to 40 Hz, from within the subterranean wellbore using the downhole telemetry tool, the received electromagnetic telemetry signal including a telemetry signal and noise;
   (b) selecting a portion of the received electromagnetic telemetry signal;
   (c) computing a measured power spectral density (PSD) of the portion selected in (b);
   (d) computing a theoretical power spectral density (PSD) of the transmitted electromagnetic telemetry signal at the known carrier frequency; and
   (e) processing the measured PSD computed in (c) in combination with the theoretical PSD computed in (d) to compute an attenuation factor of the transmitted electromagnetic telemetry signal at a plurality of frequencies.

2. The method of claim 1, further comprising:
   (f) changing a transmission configuration of the downhole telemetry tool in response to the attenuation factor computed in (e).

3. The method of claim 2, wherein (f) comprises changing at least one of a carrier frequency, a bit rate, and an amplitude of the transmitted electromagnetic telemetry signal.

4. The method of claim 1, wherein (a) comprises:
   (i) causing the downhole telemetry tool to transmit the electromagnetic telemetry signal at the known carrier frequency; and
   (ii) receiving the transmitted telemetry signal at the earth's surface.

5. The method of claim 1, wherein the portion of the received electromagnetic telemetry signal selected in (b) is transmitting during a static surveying operation.

6. The method of claim 1, wherein the portion of the received electromagnetic telemetry signal selected in (b) is transmitting during a drilling operation such that the selected portion has a signal to noise ratio greater than a predetermined threshold.

7. The method of claim 1, wherein the theoretical PSD is computed in (d) based on quadrature phase shift keying (QPSK) modulation for the transmitted electromagnetic telemetry signal at the known carrier frequency and having an identical bit rate to the electromagnetic telemetry signal received in (a).

8. The method of claim 1, wherein the processing in (e) further comprises:
   (i) applying a scaling factor to the measured PSD computed in (c) or the theoretical PSD computed in (d) such that an amplitude of the measured PSD substantially equals an amplitude of the theoretical PSD at the known carrier frequency;
   (ii) computing a difference between the measured PSD and the theoretical PSD at each of the plurality of frequencies; and
   (iii) processing the difference computed in (ii) to determine the attenuation factor.

9. The method of claim 8, wherein the difference is computed in (ii) at frequencies corresponding to at least one side lobe peak above and below the known carrier frequency in the measured PSD and the theoretical PSD.

10. The method of claim 1, wherein the processing in (e) further comprises:
    (i) applying a scaling factor to the measured PSD computed in (c) or the theoretical PSD computed in (d) such that an amplitude of the measured PSD substantially equals an amplitude of the theoretical PSD at the known carrier frequency;
    (ii) computing a difference between the measured PSD and the theoretical PSD at each of the plurality of frequencies;
    (iii) fitting the difference to a mathematical function in a selected frequency range; and
    (iv) processing the function to compute the attenuation factor at the plurality of frequencies.

11. The method of claim 10, wherein the mathematical function is a linear function.

12. The method of claim 10, wherein the frequency range is automatically selected in (iii) such that a linear mathematical function achieves the fitting within a predetermined threshold.

13. The method of claim 1, wherein the processing in (e) further comprises:
    (i) applying a scaling factor to the measured PSD computed in (c) or the theoretical PSD computed in (d) such that an amplitude of the measured PSD substantially equals an amplitude of the theoretical PSD at the known carrier frequency;
    (ii) computing a difference between the measured PSD and the theoretical PSD at each of the plurality of frequencies;
    (ii) fitting the difference to a mathematical function in a selected frequency range; and
    (iv) adding the function to the theoretical PSD in the selected frequency range to compute a modeled attenuated PSD; and
    (v) taking a ratio of the modeled attenuated PSD to the theoretical PSD to compute a plurality of attenuation factors at the plurality of frequencies.

14. The method of claim 13, wherein (e) further comprises:
    (vi) fitting the plurality of attenuation factors to a function;

(vii) processing the function to compute an attenuation factor at a frequency other than the plurality of frequencies.

15. The method of claim 1, further comprising computing a ratio of power spectral density amplitudes of a first frequency to a second frequency to compute the attenuation factor.

16. The method of claim 1, further comprising:
changing at least one of a carrier frequency, a bit rate, and an amplitude of the transmitted electromagnetic telemetry signal in response to the attenuation factor computed in (e).

17. A method for configuring an electromagnetic telemetry transmission of a downhole telemetry tool deployed in a subterranean wellbore, the method comprising:
(a) receiving a telemetry signal at a surface of the Earth during a process of drilling the subterranean wellbore, the telemetry signal transmitted at a known carrier frequency from within the subterranean wellbore using the downhole telemetry tool;
(b) computing a measured power spectral density (PSD) of the telemetry signal received in (a);
(c) computing a theoretical power spectral density (PSD) of the transmitted telemetry signal at the known carrier frequency;
(d) applying a scaling factor to the measured PSD computed in (b) or the theoretical PSD computed in (c) such that an amplitude of the measured PSD substantially equals an amplitude of the theoretical PSD at the known carrier frequency;
(e) computing a difference between the measured PSD and the theoretical PSD at each of a plurality of frequencies;
(f) fitting the difference to a mathematical function in a selected frequency range;
(g) adding the mathematical function to the theoretical PSD in the selected frequency range to compute a modeled attenuated PSD; and
(h) taking a ratio of the modeled attenuated PSD to the theoretical PSD to compute attenuation factors at the plurality of frequencies.

18. The method of claim 17, further comprising:
(i) fitting the attenuation factors to the mathematical function; and
(j) processing the function to compute an attenuation factor at a frequency other than the plurality of frequencies.

19. The method of claim 17, further comprising:
(i) changing at least one of a carrier frequency, a bit rate, and an amplitude of the transmitted telemetry signal in (a) in response to the attenuation factors computed in (h) (i).

* * * * *